Inventor
ALFRED NIGEL BLADES

Dec. 13, 1966     A. N. BLADES     3,291,347
APPARATUS FOR DISPENSING MEASURED VOLUMES OF FLUID
Filed Sept. 1, 1965     3 Sheets-Sheet 2

Inventor
ALFRED NIGEL BLADES
BY
*Silverman & Cass*
ATTYS.

Dec. 13, 1966   A. N. BLADES   3,291,347
APPARATUS FOR DISPENSING MEASURED VOLUMES OF FLUID
Filed Sept. 1, 1965   3 Sheets-Sheet 3

Inventor
ALFRED NIGEL BLADES
BY
*Silverman & Cass*
ATTYS.

United States Patent Office 3,291,347
Patented Dec. 13, 1966

3,291,347
APPARATUS FOR DISPENSING MEASURED VOLUMES OF FLUID
Alfred Nigel Blades, Dorchester, England, assignor to Coulter Electronics, Inc., Hialeah, Fla., a corporation of Illinois
Filed Sept. 1, 1965, Ser. No. 484,304
Claims priority, application Great Britain, Sept. 10, 1964, 37,037/64
10 Claims. (Cl. 222—136)

This invention relates generally to apparatus for dispensing measured volumes of fluid and, more particularly, concerns the provision of novel apparatus for measuring precise volumetric quantities of a fluid and dispensing the same in a plurality of successive steps for testing purposes.

It is desirable in various analytical procedures to withdraw a precisely measured sample of fluid from one system and transfer the same to another system for the performance of further procedures. Often such procedures require the dilution of the sample with a second or other fluid. In many test situations, such as multiple blood testing, it is necessary to perform a rapid series of tests on a large number of samples. Such tests would be desirably performed in automated apparatus if it were not for substantial difficulties encountered in effecting the rapid measurement and transfer of quantities of fluid in a succession of steps without loss in accuracy and/or precision.

The principal object of this invention is to provide means for effecting the measurement of precise volumes of fluid from one system and dispensing thereof to another system singly or in continuous steps manually and/or automatically without loss in accuracy and/or precision.

Another object of this invention is to provide a measuring and dispensing system for fluids comprising a pair of engaged members arranged movable one relative to the other wherein one of said members is provided with at least one measuring conduit extending therethrough, and the other member being arranged with at least a pair of conduits adapted for communicating connection between a pair of fluid systems respectively and arranged that in one position of the members relative to one another, fluid is caused to flow into the measuring conduit from one of said pair of fluid systems and in another relative position of said members, fluid is caused to flow to the measuring conduit from the other of said pair of fluid systems and at the same time delivering the fluid of the first system to a desired location.

Another object of this invention is to provide a system as last described wherein the measuring conduit is one which has a precise predetermined volume.

Still another object of the invention is to provide a system as described above wherein one end of the conduit may consist of a pipette into which fluid is drawn by suction applied to the other end thereof.

A further object of the invention is to provide a system as described above wherein same may be operated in successive, timed steps.

A still further object of this invention is to provide a system as described above wherein the conduits are arranged so that more than one measuring conduit is provided and same are discharged simultaneously.

Another object of this invention is to provide a system as described above wherein the conduits are arranged so that more than one measuring conduit is provided and same are filled and discharged in separate, successive steps.

Other objects of the invention include the provision of a system for measuring and dispensing of precise volumetric quantities of fluid, which system is relatively inexpensive, simple to operate and maintain, easy to disassemble and clean and is adaptable for many analytical procedures.

An important object of this invention is also to provide a novel apparatus for measuring and dispensing of precise volumes of fluid in combination with a system for analyzing said fluid.

Yet a still further object of this invention is to provide a system for measuring and dispensing of precise volumetric quantities of fluid which system is particularly adapted for automatic sample handling, said system being capable of effecting precise dilutions of successive samples and transporting the said sample and a metered quantity of diluent to a mixing duct or chamber for analysis.

Other objects and advantages of the invention will be evident from the description of several preferred embodiments of the invention with reference to the accompanying drawings.

In the drawings:
FIG. 1 is a diagrammatic sectional view of a simple form of the apparatus embodying the invention having a single measuring conduit and shown in the measuring position.

Generally, the invention is embodied in a pair of engaged members arranged to rotate one relative to the other wherein one of the members is provided with a measuring conduit extending therethrough, and the other member is formed with at least a pair of conduit systems communicatively arranged with a source of fluid so that in one position of the members relative to one another, fluid is caused to flow into the measuring conduit by way of one of said pair of conduit systems and in another position of the members relative one to the other, the measured quantity of fluid is dispensed or caused to flow by way of the other of said pair of conduits to a location at which it is required. The quantity of fluid may be measured by filling the entire measuring conduit which has a precisely predetermined volume. Alternatively, one end of the measuring conduit may consist of a pipette into which the fluid is drawn by suction applied to the other end.

Preferably the two members consist of a rotary member, such as a stopcock, containing the measuring conduit and a stationary member in which the said pair of conduits are arranged. In one position, suction may be applied to draw the fluid into the measuring conduit, the rotary member then being turned so as to carry the measured volume of the fluid to a second position where it is driven out of the said rotary member by a second fluid fed to the measuring conduit. For example, the first fluid may be blood and the other consist of a saline solution. Thereafter the rotary member may be returned to its original position either by turning it in the same direction or in the reverse direction. For automatic operation, the rotary member is arranged preferably to be turned in uni-directional timed steps.

The rotary member may be furnished with more than one measuring conduit and the above referred to pair of conduits in the stationary member may be arranged either so that the measuring conduits are filled and discharged simultaneously, or so that they are operated in succession.

Figure 1:
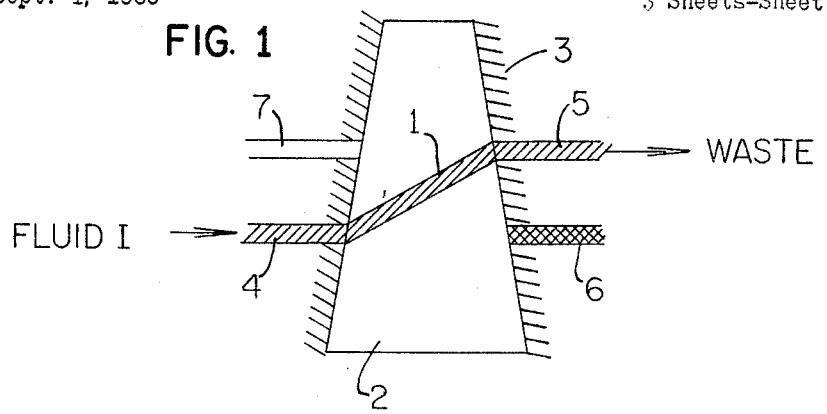
Figure 2:
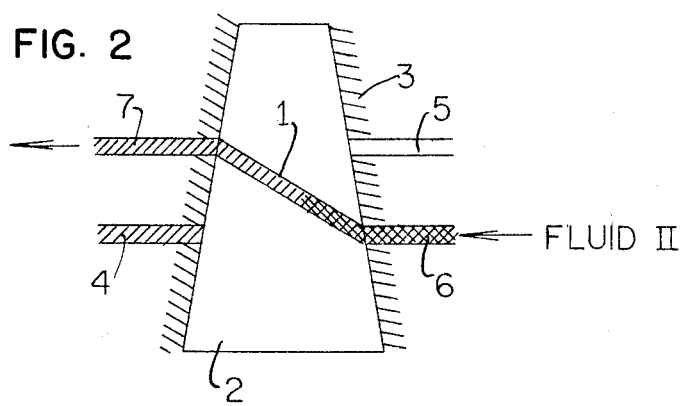
FIG. 2 is a similar view of the apparatus illustrated in FIG. 1 but shown in its delivery position.

Referring to FIGS. 1 and 2, the measuring conduit 1 comprises an oblique passage in the diametrical plane of the frusto-conical rotary member 2 that fits a corresponding aperture formed in a stationary member 3. Stationary member 3 has four conduits 4, 5, 6 and 7, opening to the aperture. A stationary conduit 4 is connected to a source of a first fluid, such as blood, and a stationary conduit 6 is connected to a source of a second fluid, such as a saline solution.

When the rotary member 2 is in the position illustrated in FIG. 1, a pressure differential is applied, say by suction to the stationary conduit 5 so as to draw the first fluid from the stationary conduit 4 and through the measuring conduit 1, the means to create such pressure differential being connected to a waste receptacle (not shown). Thereafter the rotary member 2 is rotated to the position illustrated in FIG. 2, carrying a precise volume of the first fluid which is equal to the predetermined volume of the measuring conduit 1. The second fluid is forced thereafter through the stationary conduit 6 so as to drive the first fluid out of the measuring conduit 1 and through the stationary conduit 7 to the location at which it is required while at the same time scavenging fluid from the measuring conduit 1. Thereafter the rotary member 2 is moved either in the same direction or in the reverse direction to return to the position illustrated in FIG. 1 with a second or new batch of the first fluid, which may be derived from a new sample of blood, being drawn into the measuring conduit 1. The second fluid may be provided as a precisely measured volume in a separate container (not shown). Thus precise dilutions may be made using the novel apparatus. Precise dilutions of successive samples and the transport of the sample and a metered quantity of second fluid (say diluent) to a mixing duct or chamber for analysis will be seen as a prime attribute of this invention.

The parts of the apparatus may be made of such material as is convenient. For example, the rotary member 2 and the stationary member 3 may be formed of glass ground to shape on the conical surfaces. Where it is essential to prevent surface adherence of the fluid or its contents, the member presenting the surface is formed of polytetrafluroethylene.

The measuring conduit may consist of a capillary tube insert of predetermined volume disposed in suitable bores formed in the rotary member 2. This permits interchangeable tubes of different bores or predetermined volumes to be utilized.

When it is desired to dispense a number of samples simultaneously, the rotary member 2 may be formed with a number of measuring conduits 1 each associated with the four conduits formed in the stationary member. However, when it is necessary for the same volume to be measured by each of the measuring conduits, the bores defining the longer conduits must be made correspondingly narrower than the bores defining the shorter conduits. This is because of the frusto-conical configuration of the rotary member 2. It is also possible to equalize the relative volumes of said plural measuring conduits by providing those measuring conduits nearer the wide end of the rotary member to be correspondingly offset from the diametrical plane or set at a smaller obliquity in said diametrical plane. Of course, the rotary member 2 may be cylindrical in configuration and therefore all the measuring conduits may be of equal length and bore so that they are of equal volume.

Figure 3:
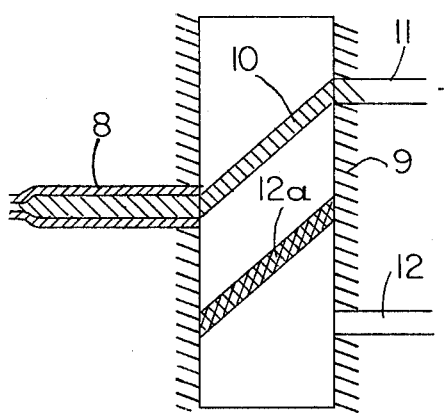
FIG. 3 is a diagrammatic sectional view illustrating a modified form of the apparatus according to the invention shown in measuring position.
Figure 4:
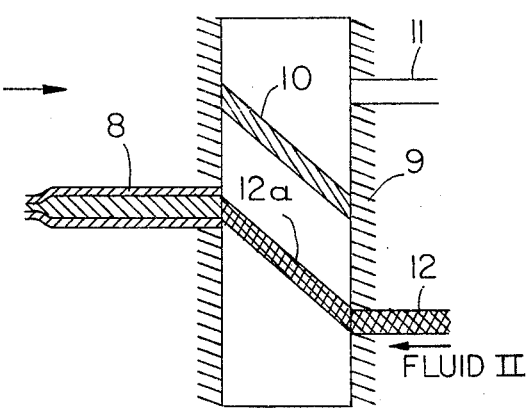
FIG. 4 is a view of the apparatus shown in FIG. 3 but in delivery position.

Referring now to FIGS. 3 and 4, the measurement therein is effected in an interchangeable pipette 8 secured to the stationary member 9. When the rotary member 2 is in the position shown in FIG. 3, suction is applied to the pipette 8 through a rotor conduit 10 and a conduit 11 in the stationary member 9. This enables the first fluid to be drawn into the pipette 8 so as to fill the same. The rotary member 2' is then turned to the position shown in FIG. 4 wherein the second fluid is forced through a stationary conduit 12 and the measuring duct 12a to drive the first fluid out of the pipette into a receptacle (not shown). The said receptacle may then be utilized to carry the measured volume of the first fluid, together with some of the second fluid, to a location where the mixture is required, for example, apparatus for counting the corpuscles in a given volume of blood.

Figure 5:
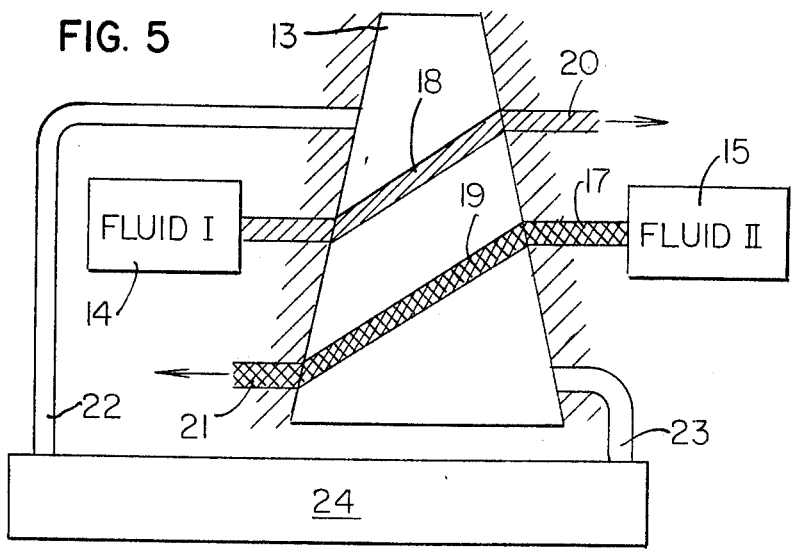
FIG. 5 is a diagrammatic sectional view of a modified embodiment of the invention wherein the apparatus includes a pair of measuring conduits and is shown in an arrangement for feeding two separate fluids in measured quantities to a single analytical system.
Figure 6:
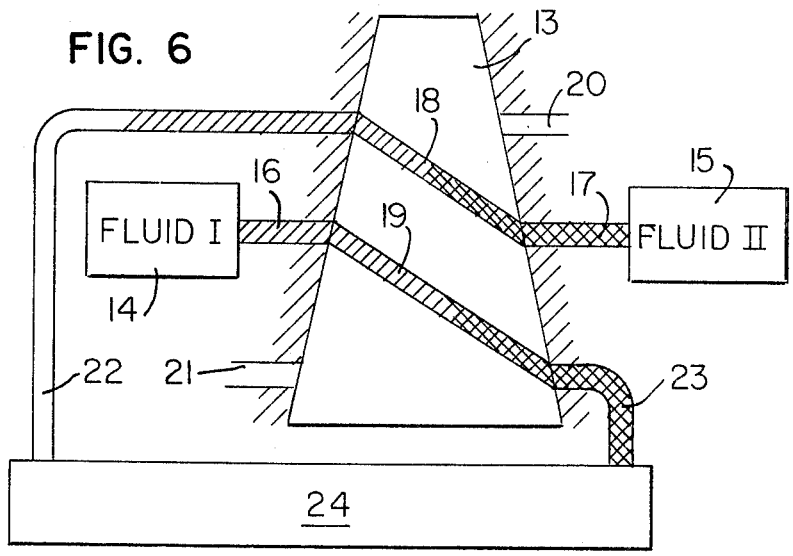
FIG. 6 is a view similar to that of FIG. 5 but illustrating the apparatus of FIG. 5 disposed in a second position.

Referring now to FIGS. 5 and 6 wherein an arrangement is shown that is particularly suitable for automatic operation, here the rotary member 13 is arranged to be turned in timed steps as by a motor (not shown). Here sources 14 and 15 of the first and second fluids are connected respectively by stationary conduits 16 and 17 to the conical aperture receiving the rotary member 13. The rotary member has a pair of measuring conduits 18 and 19.

In the position shown in FIG. 5, the first fluid either is forced or drawn through the stationary conduit 16 to fill the measuring conduit 18, and the second fluid either is forced or drawn through the stationary conduit 17 to fill the measuring conduit 19. In this position, the free ends of the measuring conduits 18 and 19 are connected respectively two ways through stationary conduits 20 and 21. The waste fluid desirably may be returned respectively to the sources 14 and 15.

Referring to FIG. 6, the rotary member 13 has been turned and the measured volumes of fluid from the measuring conduits 18 and 19 passed through the stationary conduits 22 and 23 to apparatus 24 where they are utilized in further procedures. The second fluid is caused, by means of pressure or suction, to follow the first fluid through the measuring conduit 18 and the stationary conduit 22, and the first fluid is caused to follow the second fluid through the measuring conduit 19 and the stationary conduit 23.

Figure 7:
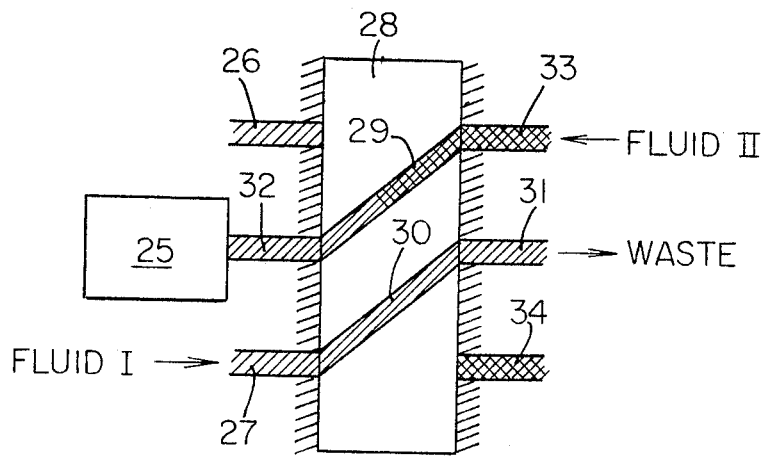
FIG. 7 is a diagrammatic sectional view of a still further modification of the apparatus according to the invention as incorporated in a specific analytical system for use in measuring and delivering a pair of different fluids to said system.
Figure 8:
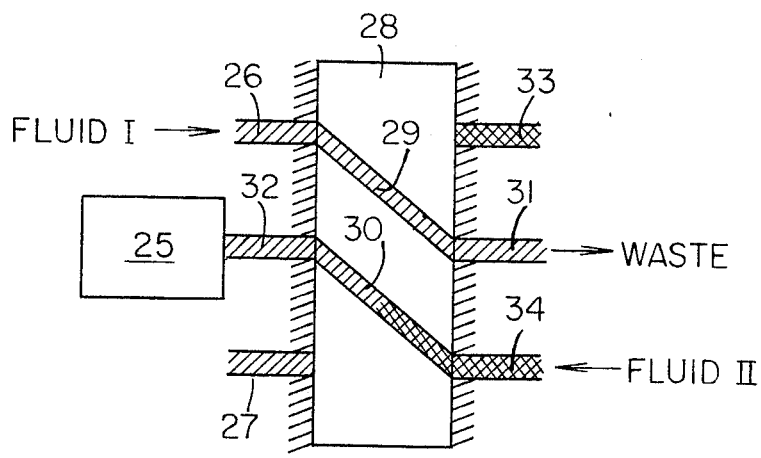
FIG. 8 is a view similar to that of FIG. 7 showing the apparatus illustrated in FIG. 7 in a second delivery position.

In FIGS. 7 and 8, a device 25, such as a particle counting apparatus, is fed alternately with measured volumes of the first fluid derived respectively from stationary conduits 26 and 27. The rotary member 28 is formed with two measuring conduits 29 and 30. When the rotary member 28 is in the position illustrated in FIG. 7, suction is applied through a stationary conduit 31 drawing the first fluid from the stationary conduit 27 to fill the measuring conduit 30. Simultaneously, the first fluid originally, derived from the stationary conduit 26, and measured in the measuring conduit 29, is forced through a stationary conduit 32 by the second fluid delivered into the measuring conduit 29 from a stationary conduit 33. In FIG. 8, the rotary member 28 is positioned so that the suction applied through the stationary conduit 31 fills the measuring conduit 29 from a stationary conduit 26. Simultaneously, the fluid in the measuring conduit 30 is driven into the analytical device 25 by a second fluid supplied through a stationary conduit 34.

In the examples illustrated in FIGS. 5–8, as well as the other embodiments, the second fluid is adapted to be carefully metered so as to obtain not only a transfer of a given amount of first fluid but to effect a precise dilution so necessary in many analytical procedures.

One skilled in the art of blood testing, for example, hemoglobin determinations, counts and the like, is well aware of the necessity for accurate dilutions. In such instances, the second fluid (the diluting fluid) is precisely metered in quantity.

The invention has been sufficiently described such as to enable those skilled in this art to understand and appreciate the same and to build structures embodying the same. Considerable variation is capable of being made in the details of the structure without in any way departing from the spirit or scope of the invention as described in the appended claims.

What it is desired to secure by Letters Patent of the United States is:

1. A measuring and dispensing apparatus for directing measured quantities of fluid to a predetermined location comprising, two members arranged to move one with respect to the other, at least first and second fluid sources for first and second fluids respectively, at least first and second independent conduit systems communicating between the respective fluid sources and the predetermined location solely through said two members, one member having a pair of spaced, parallel through-ducts formed therein and the other member communicating with part of each of said independent conduit systems, said one member arranged to move relative to the other between first and second positions, the first position being defined with one of said through-ducts in communication with the first fluid conduit system, and the second position being defined with said one through-duct being blocked from communication with the first fluid conduit system, and means for establishing a pressure differential for moving said first and second fluids to introduce first fluid into said one through-duct from said first fluid conduit system when said one member is in the first position and to cause the second fluid to enter the other one of said through-ducts to discharge a measured quantity of first fluid to said predetermined location when said one member is in the second position, at least one of said members having a measuring duct of precise bore formed therein and said discharged first fluid is introduced into said measuring duct when said one member is in the first position and discharged therefrom when said one member is in the second position.

2. The apparatus as claimed in claim 1 in which said measuring duct is a pipette leading to said predetermined location and said through-ducts are the sole communication between the respective fluid conduit systems and the said measuring duct.

3. The apparatus as claimed in claim 1 in which said measuring duct and said one through-duct is formed as one passage in said one member.

4. The apparatus as claimed in claim 1 in which said measuring duct and said one through-duct are formed as one passage in said one member and the other through-duct is a bore of predetermined dimension whereby both through-ducts function as measuring ducts to feed measured quantities of first and second fluids respectively to a single location.

5. The apparatus as claimed in claim 1 in which a hollow sleeve removably is disposed in one of said through-ducts, the ends of said sleeve being flush with each of the opposite open ends of said through-ducts, said sleeve having a length equal to the length of said duct and carrying a bore of volume equal to said measured quantity whereby to consitute said one through-duct said measuring conduit, said sleeve capable of being exchanged for any one of a plurality of like sleeves of differing bore dimension whereby selectively to vary the said measured quantity between known limits.

6. The apparatus as claimed in claim 1 in which said second fluid is metered in known volume to said one through-duct when the one member is in the second position.

7. In combination with a device adapted to be fed alternately with measured volumes of fluid, means to measure and dispense said fluid, said means comprising, a stationary member including at least two pair of conduits, one of each of said pair of conduits communicating to a source of first and second fluids respectively, and the other of each of said pair of conduits communicating respectively with said device and a source of fluid pressure respectively, and said stationary member having an aperture between each pair of said conduit pairs, a movable member of conforming configuration to that of the aperture of the stationary member, said movable member having a pair of spaced, through passageways therein, said movable and stationary members arranged in coupled relation whereby said members alternate between first and second positions, the first position being defined where one of said through passageways communicates between the source of the second fluid and the device and the other of said through passageways communicates between the source of the second fluid and the source of fluid pressure, the second position being defined where said one of said through passageways communicates between the source of the first fluid and said source of fluid pressure and the said other of said through passageways communicates between the source of the second fluid and said device, said fluid pressure being applied when the said members are in the first position to draw the first fluid to fill the said other of the through passageways with the same and simultaneously to cause the second fluid to displace any fluid disposed in the said one of said through passageways to discharge same to said device, and said fluid pressure adapted to be applied when the said members are in the second position to draw first fluid to fill the said one of the through passageways and simultaneously to cause the second fluid to displace the first fluid disposed in the said other one of said through passageways to discharge the same to the said device, said through passageways each having a known, predetermined volume whereby the fluid discharged to the said device comprises measured quantities of known volume.

8. The apparatus as claimed in claim 7 wherein the said source of fluid pressure comprises suction means for drawing the first fluid from the source thereof and pressure means for forcing the second fluid into the respective through passageways in the first and second positions respectively of the said members.

9. The apparatus as claimed in claim 7 wherein there are a pair of conduits communicating to said device whereby both first and second fluids are discharged to said device simultaneously in said measured quantities.

10. The apparatus as claimed in claim 7 wherein said movable member comprises a rotor of frusto-conical configuration and said through passageways comprise bores taken obliquely through the rotor, each being of differing predetermined relative inner diameters whereby to contain identical volumes of fluid.

References Cited by the Examiner

UNITED STATES PATENTS

| | | | |
|---|---|---|---|
| 589,386 | 8/1897 | Gerhard | 222—288 |
| 908,194 | 12/1908 | Bardy | 222—136 X |
| 1,409,009 | 3/1922 | Julien | 222—288 |
| 1,805,607 | 5/1931 | Wilson | 222—137 X |
| 2,022,951 | 12/1935 | Cohen | 222—136 X |
| 2,081,544 | 5/1937 | Krivig | 222—136 X |
| 2,271,144 | 1/1942 | McKay | 222—136 X |
| 2,515,594 | 7/1950 | Fischman | 222—288 X |
| 2,670,101 | 2/1954 | Heisterkamp et al. | 222—194 X |
| 2,785,831 | 3/1957 | Smolin | 222—70 |
| 2,901,149 | 8/1959 | Richter | 222—194 X |
| 2,914,223 | 11/1959 | Richter | 222—194 |
| 3,209,959 | 3/1963 | Agner | 222—194 X |

OTHER REFERENCES 1,032,002, German application (KL421 4 01) June 1958, 222–136, Imperial Chemical Industries (1 sheet dwgs., 4 pp. spec.).

RAPHAEL M. LUPO, *Primary Examiner.*